(12) United States Patent
De Block

(10) Patent No.: US 6,836,926 B1
(45) Date of Patent: Jan. 4, 2005

(54) WIPER BLADE FOR WINDSHIELDS, ESPECIALLY AUTOMOBILE WINDSHIELDS, AND METHOD FOR THE PRODUCTION THEREOF

(75) Inventor: Peter De Block, Halen (BE)

(73) Assignee: Robert Bosch GmbH, Stuttgart (DE)

( * ) Notice: Subject to any disclaimer, the term of this patent is extended or adjusted under 35 U.S.C. 154(b) by 312 days.

(21) Appl. No.: 09/786,852

(22) PCT Filed: Jul. 6, 2000

(86) PCT No.: PCT/DE00/02168

§ 371 (c)(1),
(2), (4) Date: May 3, 2001

(87) PCT Pub. No.: WO01/03982

PCT Pub. Date: Jan. 18, 2001

(30) Foreign Application Priority Data

| Jul. 9, 1999 | (DE) | 199 31 856 |
| Jul. 9, 1999 | (DE) | 199 31 857 |
| Jul. 9, 1999 | (DE) | 199 31 858 |
| Jul. 5, 2000 | (DE) | 100 32 048 |

(51) Int. Cl.[7] .............................. A47L 1/00; B60S 1/02
(52) U.S. Cl. .............................. 15/250.43; 15/250.451
(58) Field of Search .................. 15/250.43, 250.44, 15/250.451, 250.48, 250.361, 250.202, 250.33

(56) References Cited

U.S. PATENT DOCUMENTS

| 3,192,551 A | * | 7/1965 | Appel | 15/250.43 |
| 4,045,838 A | * | 9/1977 | Porter | 15/250.48 |
| 5,325,564 A | * | 7/1994 | Swanepoel | 15/250.44 |
| 5,485,650 A | * | 1/1996 | Swanepoel | 15/250.43 |

FOREIGN PATENT DOCUMENTS

| DE | 12 47 161 B | | 8/1967 |
| DE | 1 505 357 | | 5/1969 |
| DE | 195 01 849 A1 | * | 8/1995 |
| DE | 198 14 610 A | | 10/1999 |
| EP | 0 528 643 A | | 2/1993 |
| EP | 0 594 451 A | | 4/1994 |

OTHER PUBLICATIONS

English translation of the Abstract to DE 195 01 849 A1.*

* cited by examiner

Primary Examiner—Robert J. Warden, Sr.
Assistant Examiner—Laura C Cole
(74) Attorney, Agent, or Firm—Michael J. Striker

(57) ABSTRACT

The invention relates to a wiper blade for windshields, especially automobile windshields, comprising at least one support element, a support element (12), a wiper strip (14) and connecting means (16) for a wiper arm (18). The support element (12) is a long flat rod to which the wiper strip (14) and the connecting means (16) are fixed. According to the invention, the flat rod has a cross-sectional profile (40), whereby $F_{wf}*L^2/48*E*I_{zz}<0.009$ when $F_{wf}$ is the pressure force exerted on the wiper blade or the pressure force for which the wiper blade was originally intended, L represents the length of the wiper blade, E stands for the elasticity module of the flat rod material and $I_{zz}$ is the moment of inertia of the cross-sectional profile around the z axis (perpendicular to an s axis associated with the flat rod and perpendicular to the y axis).

11 Claims, 6 Drawing Sheets

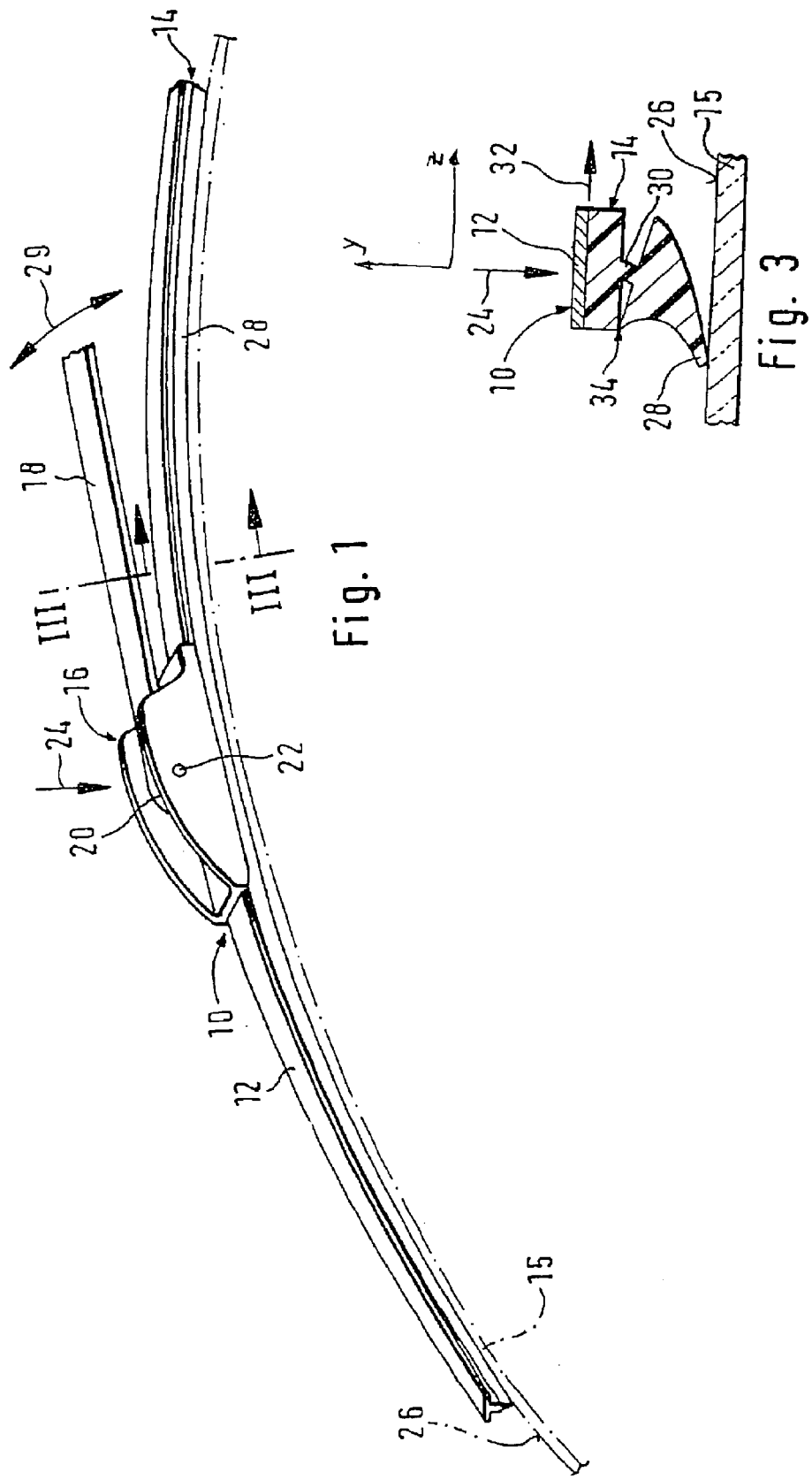

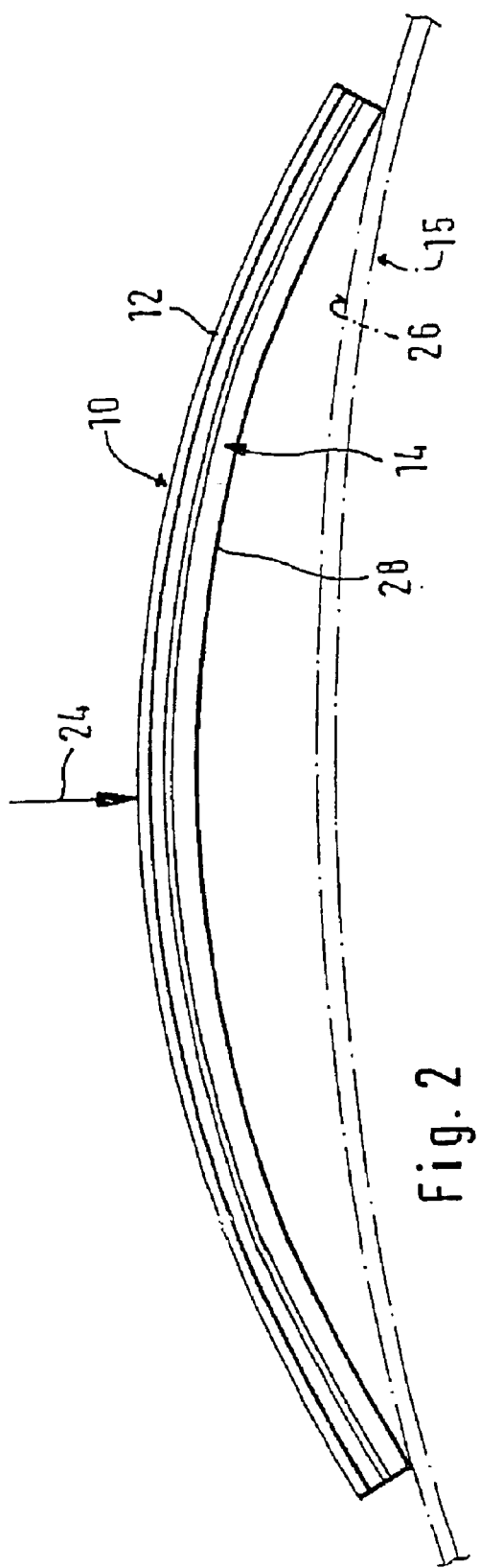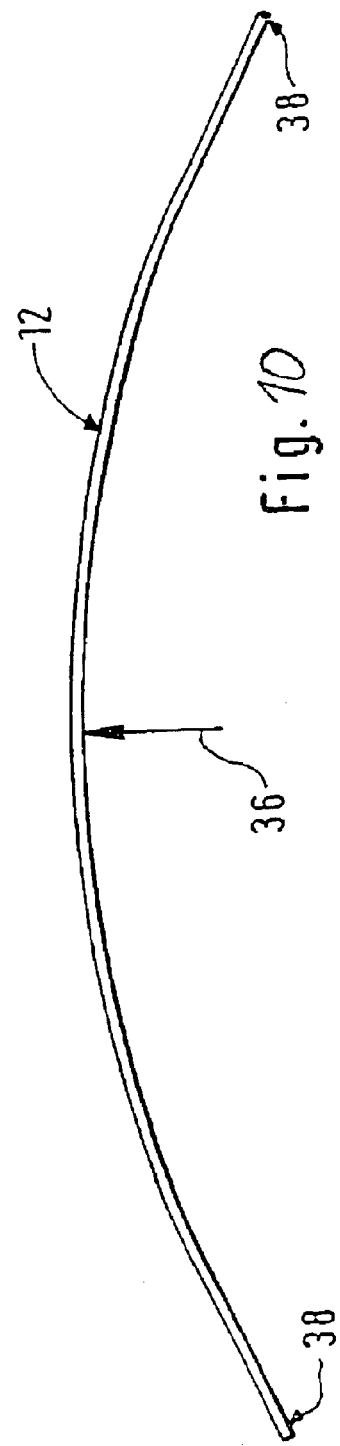

Figure 4:
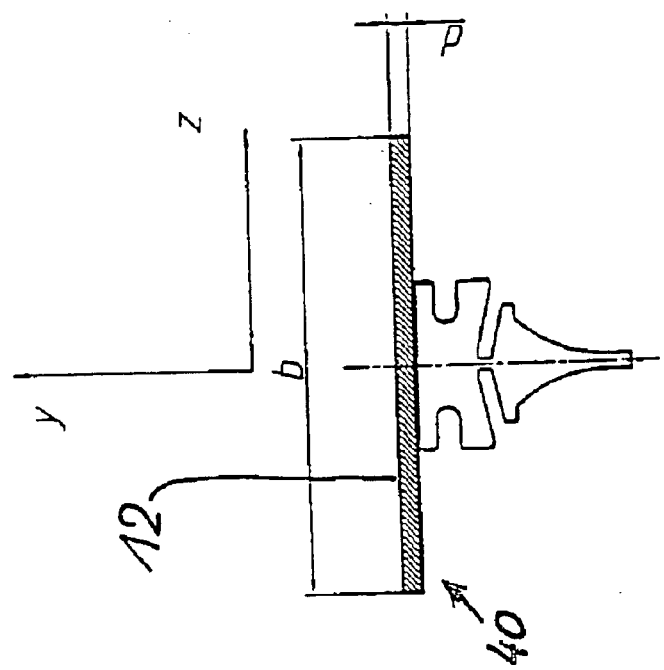

WIPER BLADE FOR WINDSHIELDS, ESPECIALLY AUTOMOBILE WINDSHIELDS, AND METHOD FOR THE PRODUCTION THEREOF

BACKGROUND OF THE INVENTION

In wiper blades of the present invention, the support element should assure a predetermined distribution of the wiper blade pressing force—often also called pressure—applied by the wiper arm against the window, over the entire wiping zone that the wiper blade sweeps across. Through an appropriate curvature of the unstressed support element—i.e. when the wiper blade is not resting against the window—the ends of the wiper strip, which is placed completely against the window during the operation of the wiper blade, are loaded in the direction of the window by the support element, which is then under stress, even when the curvature radii of spherically curved vehicle windows change in every wiper blade position. The curvature of the wiper blade must therefore be slightly sharper than the sharpest curvature measured in the wiping zone of the window to be wiped. The support element thus replaces the costly support bracket design that has two spring strips disposed in the wiper strip, which is the kind used in conventional wiper blades (DE-OS 15 05 357).

The invention is based on a wiper blade as generically defined by the independent claims. In a known wiper blade of this type (DE-PS 12 47 161), a number of embodiments of the support elements are provided as a solution to the problem of producing the most uniform possible pressure load of the wiper blade over its entire length against a flat window.

In another known wiper blade of this generic type (EP 0 528 643 B1), in order to produce a uniform pressure load of the wiper blade against spherically curved windows, the pressure load increases significantly in the two end sections when the wiper blade is pressed against a flat window.

The uniform pressure distribution over the entire wiper blade length that is sought in both cases, however, leads to an abrupt flipping over of the wiper lip, which belongs to the wiper blade and performs the actual wiping function, over its entire length, from its one drag position into its other drag position when the wiper blade reverses its working direction. This drag position is essential for an effective, quiet operation of the wiper system. The abrupt flipping over of the wiper lip, however,—which is inevitably connected with an up and down motion of the wiper blade—generates an undesirable tapping noise. In addition, the matching of the support element tension to the desired pressure distribution, which differs from case to case, is problematic with spherically curved windows.

EP 0 594 451 describes flat bar wiper blades with a varying profile, which should not to exceed a particular lateral deflection when a test force is applied to them. To that end, an extremely complex interrelationship among internal parameters that characterize the spring bar are used to determine a quantity which should not exceed a certain threshold value. The equation given permits only complex and incomplete conclusions to be reached regarding the actual quantities to be entered. The other data relate to an unstressed wiper blade so that it is hardly possible to draw conclusions as to the quality of a wiper blade during operation.

In addition, putting the teaching of the known prior art to use turns out to be difficult since the available parameters cannot be applied directly to wiper blades to be newly manufactured.

SUMMARY OF THE INVENTION

The wiper blade according to the invention, with the features of the main claim, has the advantage of an entirely favorable wiping quality because among other things, a rattling of the wiper blade across the window—the so-called slip-stick effect—is prevented. This results from the knowledge that for the slip-stick effect, attention must be paid particularly to the lateral deflection angle and less so to the absolute lag, i.e. the absolute deflection of the tips under stress. It is therefore advantageous if the wiper blade is designed so that the lateral deflection of the ends of the wiper blades, which lag behind during operation, does not exceed a lateral deflection angle of a particular magnitude. From the quantity discovered for this angle, important parameters can then be derived for the wiper blade, which have a simple relation to one another and which, in this relation, should not exceed an upper limit of 0.009. With the aid of this relation and the upper limit indicated, cross sectional profiles for the support element can be very simply determined, which then produce a favorable wiping result. In particular, wiper blades with a constant cross section over their lengths are particularly easy to produce in this manner.

Advantageous improvements and embodiments of the wiper blade according to the invention are possible by means of the measures disclosed in the remaining claims.

The wiping quality increases further if the proportion of the product of the contact force and the square of the length to the product of 48 times the elasticity modulus of the support element and the $I_{zz}$ moment of inertia does not exceed an upper limit of 0.005.

Particularly useful cross sectional profiles are rectangular in design and have an essentially constant width and an essentially constant thickness over the length of the wiper blade. The support element can also be comprised of individual bars which are disposed laterally next to one another or one on top of another and their overall width or their overall thickness are respectively added together to produce an overall width and/or an overall thickness. With such a rectangular cross sectional profile, the moment of inertia $I_{zz}$ can be entered as $d*b^3/12$, where the overall thickness and the overall width are entered as d and b, respectively. This produces an easy-to-apply relation via which the support element can be optimized for the wiper blades if the given upper limits of 0.009 and particularly 0.005 are not exceeded.

Particularly if more complex cross sectional profiles are chosen for the support element, which vary, for example, over the length of the wiper blade or have a ladder-type structure or the like, a favorable wiping quality can nevertheless be achieved if consideration is given to the fact that the lateral deflection angle γ does not exceed a magnitude of 0.5° and in particular 0.3° during operation of the wiper blade. These specifications apply for an average friction value μ of 1 and must be correspondingly increased or decreased when there are higher or lower friction values.

The lateral deflection angle γ is the angle at which the tangent to the support element end intersects the axis extending in the longitudinal direction of the support element. In a first approximation, this angle can also be understood to be the angle enclosed by the axis extending in the longitudinal span direction of the support element and a straight line passing through a support element end and the fulcrum point of the wiper arm on the support element.

Very good wiping results can be achieved if the width b and the thickness d remain in a definite proportion to the overall length of the support element. In particular, the product of the width and the square of the thickness should not exceed 40 times the square of the length and should not be less than 20 times the square of the length. The widths and/or the thicknesses of combined support elements are respectively added together to produce an overall width and overall thickness, which is then taken into consideration.

The wiper blade according to the invention has the advantage that only one parameter has to be varied in order to adjust the outwardly decreasing contact force distribution. The curvature or the curvature progression along the support element can be preset in freely programmable bending machines. As a result, short trial runs can also be carried out to optimize the contact force distribution and therefore the curvature progression rapidly and without a great deal of expense. It is particularly advantageous if the coordinate that governs the curvature progression extends along the inertial element. This eliminates the need for complex reverse calculations in a Cartesian coordinate system in which each change in a position x requires a shifting of the subsequent "x values".

The mathematical association between the second derivative of the curvature as a function of the adapted coordinate and the contact force progression likewise as a function of the adapted coordinate is particularly simple if the elasticity modulus of the support element material and the surface moment of inertia of the support element are constant over its length. With a preset contact pressure distribution, the curvature can then be directly calculated through double integration or also numerically.

An optimal adaptation of such a wiper blade to windows with a complex curvature progression is also possible if the curvature of the window is subtracted from the curvature of the support element or the second derivative of the curvature of the window is subtracted from the second derivative of the curvature of the support element. In this instance, a contact force distribution can be preset in the same way that is desirable for a wiper blade that is pressed against a flat window. The difference between the second derivatives of the respective curvatures is then once more proportional to this contact force distribution.

A wiper blade according to the invention excels in that without special adaptation, an excellent wiping result is achieved for average window types. The very simple steps taken result in the fact that the contact force distribution fulfills the requirements in most cases. The support points mentioned above are sufficiently precise to use as the basis for a curvature progression to be maintained.

Even with complex window curvature progressions, the wiping quality can be increased by presetting the contact force distribution to particular support points. It is nevertheless possible to design the wiper blade without complex calculations. The curvature progression can be essentially predetermined and can be optimized by means of simple trials. An excellent wiping quality is assured as long as the prerequisites are met that the contact force distribution that prevails when the wiper blade is pressed against the window to be wiped is greater in a region approximately halfway between the center and the end of the wiper blade than it is at the end of the wiper blade.

In a method according to the invention for producing such a wiper blade, the individual parameters are selected in accordance with the teaching according to the invention and the support element is pre-curved so that its curvature progression fulfills at least one of the conditions mentioned above. As a result, it is particularly favorable to bend the support element first and then to put it together with the wiper strip and the connecting element. However, it is also possible to attach the connecting element to the support element first and then to add the wiper strip.

DRAWINGS

Figure 5:
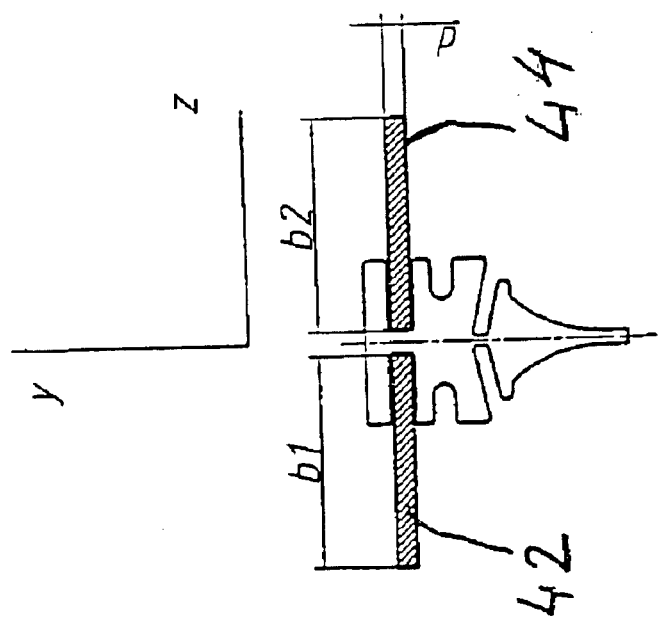
Figure 6:
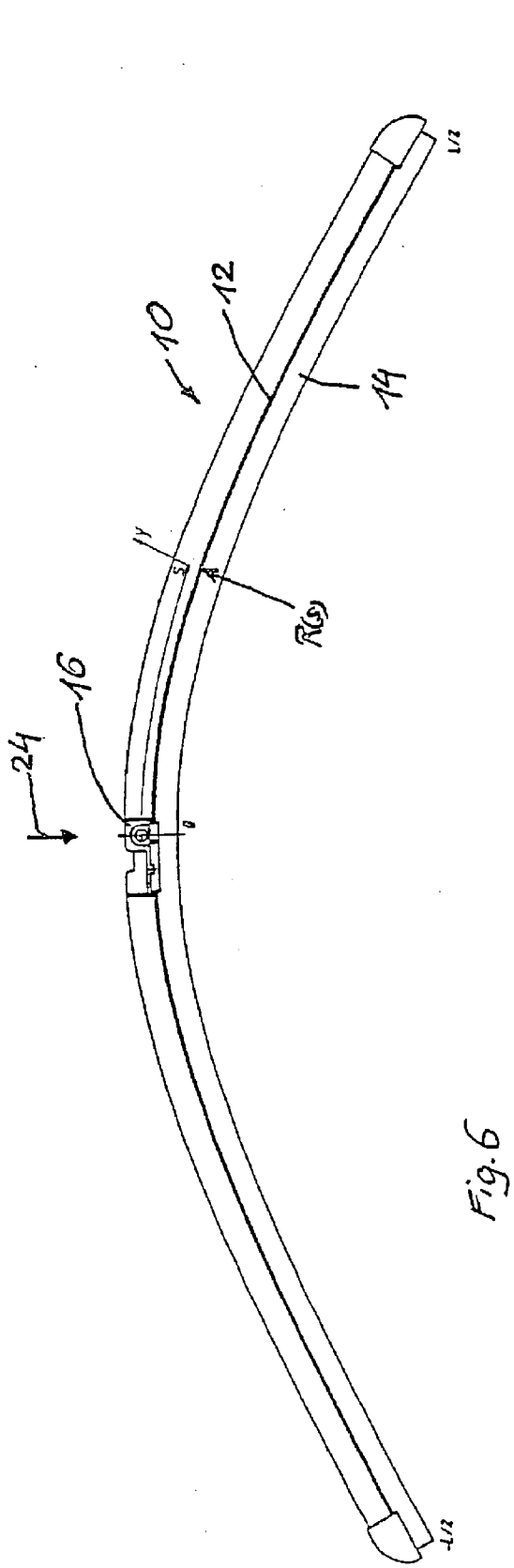
Figure 7:
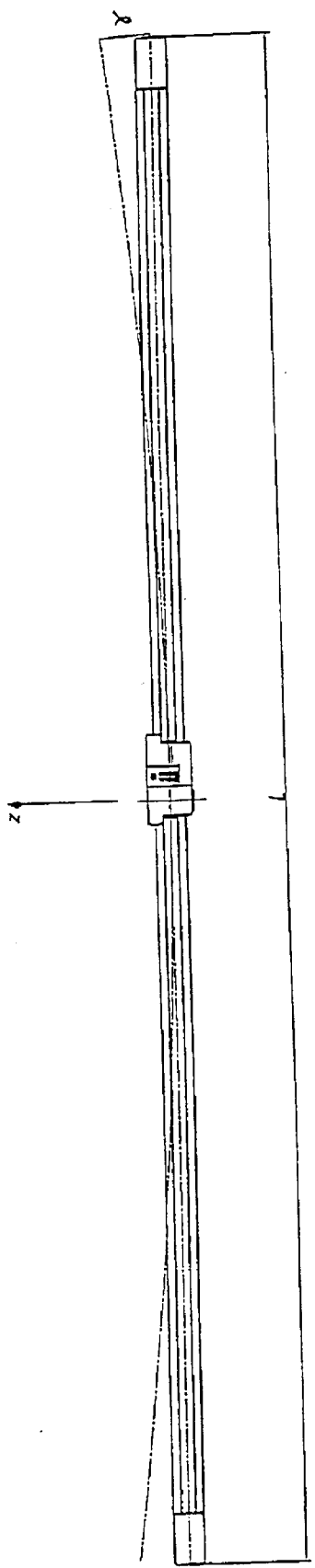
Figure 8:
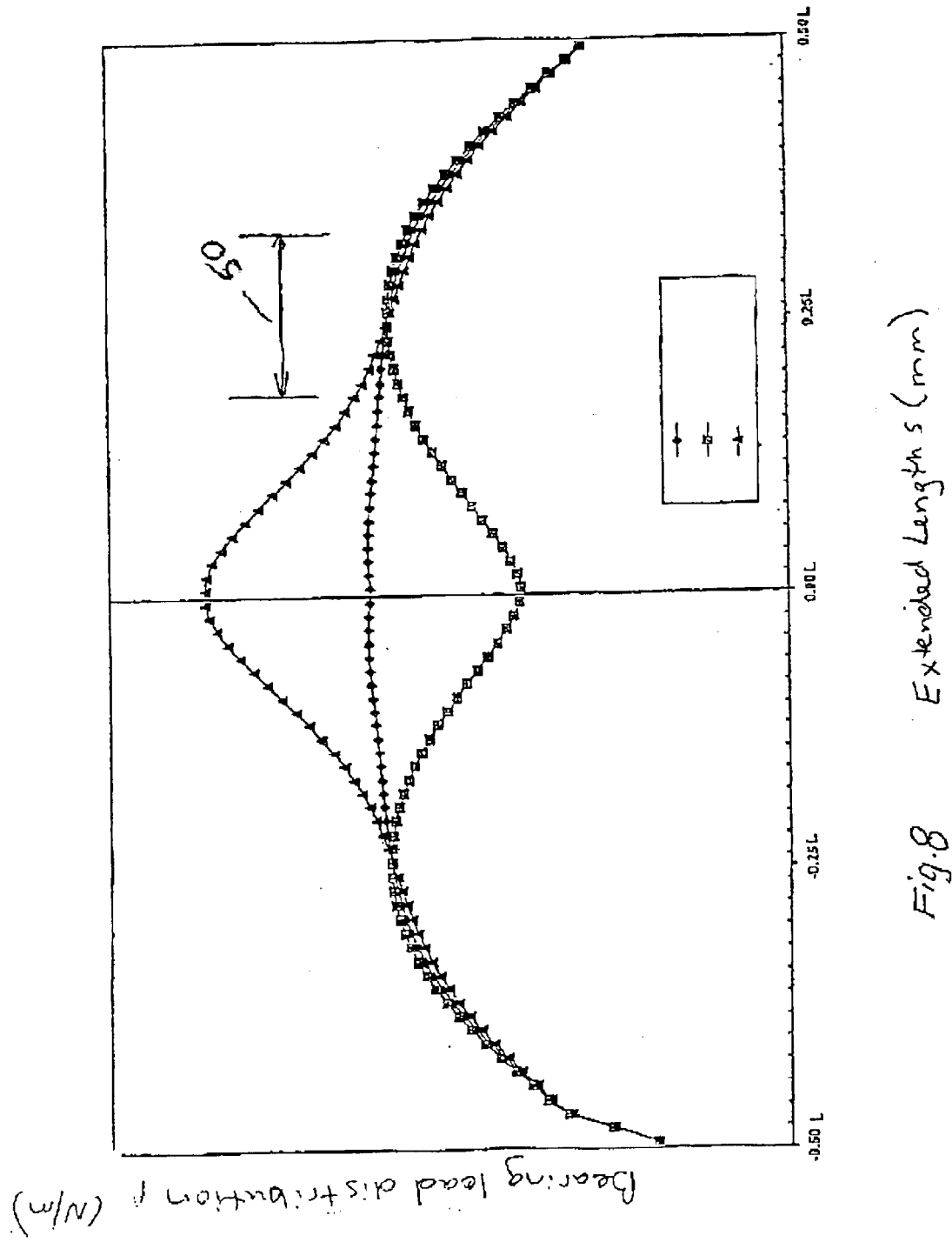
Figure 9:
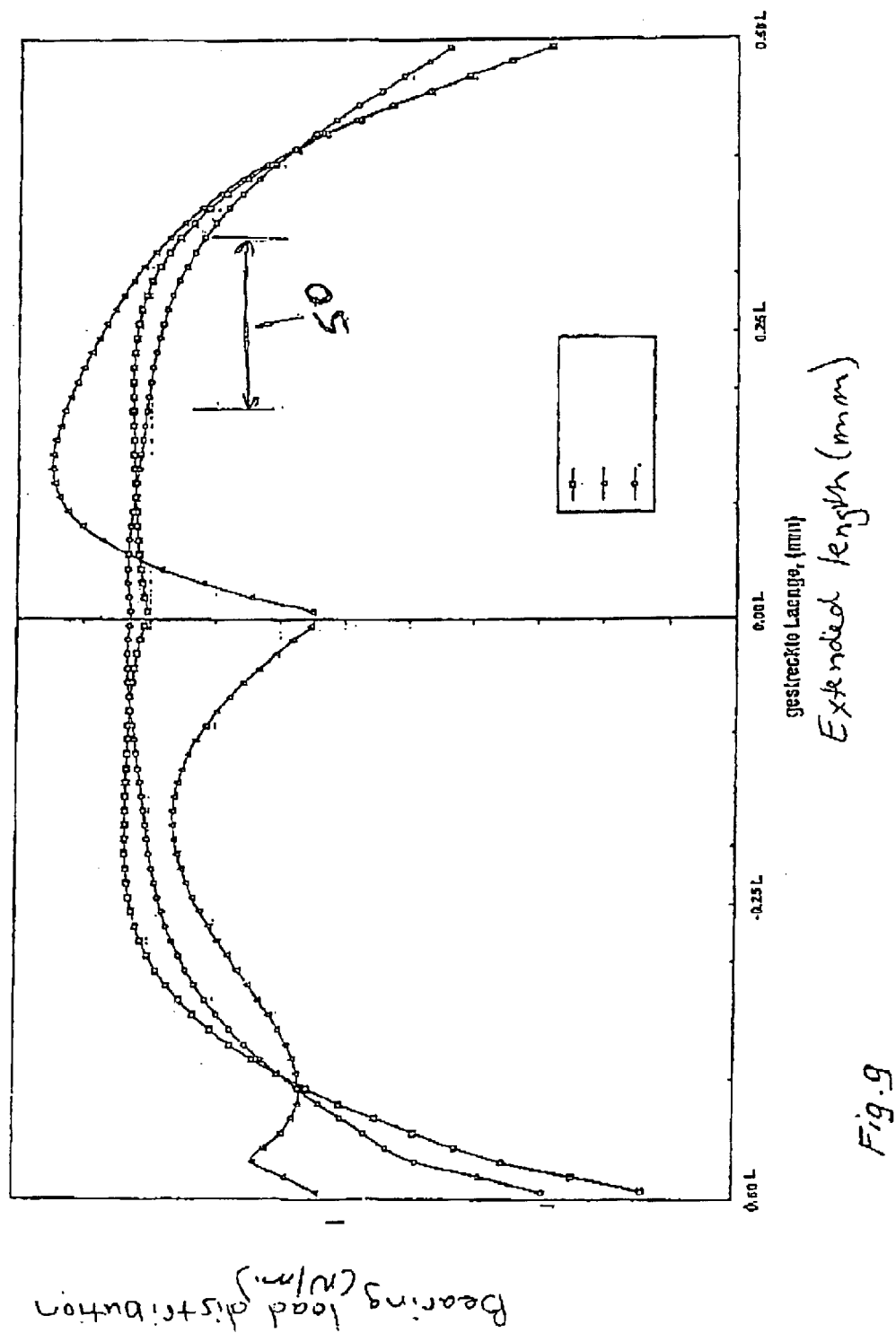

FIG. 1 is a perspective representation of a wiper blade that is placed against the window and is connected to a wiper arm which is loaded toward the window, FIG. 2 is a schematic side view of a wiper blade, which is placed in an unstressed state against the window, in a reduced scale compared to FIG. 1, FIG. 3 shows the sectional plane of an enlarged section through the wiper blade according to FIG. 1, along the line III—III, FIGS. 4 and 5 show a variant of FIG. 3, FIGS. 6 and 7 show a wiper blade in a different embodiment, with a coordinate system sketched in, FIGS. 8 and 9 respectively show calculated and measured values for the contact force distribution plotted over the length of the wiper blade, and FIG. 10 is a schematic side view, not to scale, of a support element belonging to the wiper blade.

DESCRIPTION OF THE EXEMPLARY EMBODIMENT

A wiper blade 10 shown in FIG. 1 has an elongated, spring elastic support element 12, which is also referred to as a flat bar, for a wiper strip 14, which is shown separately in FIG. 10. As shown in FIGS. 1, 3, and 4, the support element 12 and the wiper strip 14 are connected to each other with their longitudinal axes parallel. On the top side of the support element 12 remote from the window 15 to be wiped—shown with dot-and-dash lines in FIG. 1—, there is a connecting mechanism in the form of a connecting device 16 which can detachably connect the wiper blade 10 to a driven wiper arm 18 that is guided on the body of the motor vehicle. The elongated rubber elastic wiper strip 14 is disposed on the underside of the support element 12 oriented toward the window 15.

A hook, which serves as a counterpart connection means, is formed onto the free end 20 of the wiper arm 18 and engages a pivot bolt 22 that is part of the connecting device 16 of the wiper blade 10. The securing between the wiper arm 18 and the wiper blade 10 is achieved by an intrinsically known securing mechanism, which is not shown in detail and is embodied in the form of an adapter.

The wiper arm 18, and therefore also its hook ends 20, is loaded in the direction of the arrow 24 toward the window 15 to be wiped, whose surface to be wiped is indicated with a dot-and-dash line 26 in FIGS. 1 and 2. The contact force $F_{wf}$ (arrow 24) places the wiper blade 10 with its entire length against the surface 26 of the window 15 to be wiped.

Since the dot-and-dash line 26 shown in FIG. 2 is intended to represent the sharpest curvature of the window surface in the vicinity of the wiping zone, it is clear that the curvature of the wiper blade 10, which is as yet unstressed and rests with its two ends against the window, is sharper than the maximal curvature of the spherically curved window 15. When the contact force $F_{wf}$ (arrow 24) is applied, the wiper blade 10 rests with its wiper lip 28, which is part of the wiper strip 14, over its entire length against the window surface 26. This produces a tension in the band-like, spring elastic support element 12, which ensures a proper contact of the wiper strip 14 or rather the wiper lip 28 over its entire length against the vehicle window 15. During wiper operation, the wiper arm 18 moves the wiper blade 10 lateral to its longitudinal span, across the window 15. In FIG. 1, this wiping or working motion is indicated by the double arrow 29.

The particular embodiment of the wiper blade according to the invention will now be discussed in detail below. As shown in FIG. 3, not to scale, the wiper strip 14 is disposed on the lower band surface of the support element 12, oriented toward the window 15. Spaced apart from the support element 12, the wiper strip 14 is indented on its two longitudinal sides so that a tilting hinge 30 remains in its longitudinal center region, which extends over the entire length of the wiper strip 14. The tilting hinge 30 transitions into the wiper lip 28, which has an essentially wedge-shaped cross section. The contact force (arrow 24) presses the wiper blade or rather the wiper lip 28 against the surface 26 of the window 15 to be wiped, and as a result of the wiping motion—of which FIG. 3 particularly shows the one of the two opposite wiping motions (double arrow 29) indicated by the direction arrow 32—the wiper lip 28 tilts into a so-called drag position, in which the wiper lip is supported along its entire length against the part of the wiper strip 14 that is secured to the support element 12. This support, which is indicated with the arrow 34 in FIG. 3, always takes place—depending on the respective wiping direction (double arrow 29 and arrow 32, respectively)—against the upper edge of the wiper lip 28 disposed toward the rear in the respective wiping direction so that the wiper lip 28 is always guided across the window in a so-called drag position. This drag position is required for an effective, quiet operation of the wiper device. The reversal of the drag position takes place at the so-called reversal position of the wiper blade 10, when the blade changes its wiping direction (double arrow 29). As a result, the wiper blade executes an up and down motion which is necessitated by the tilting over of the wiper lip 28. The upward motion occurs counter to the direction of the arrow 24 and consequently also counter to the contact force. In the opposite wiping direction from the arrow 32, a mirror image of FIG. 3 is consequently produced.

FIG. 4, which is an enlarged depiction in comparison to the wiper blade in FIG. 1, shows a cross sectional profile 40 that has a rectangular sectional plane with a width b and a thickness d. In addition, a coordinate system is shown above the support element 12. An s-coordinate, which follows the curvature of the support element 12, is shown as a $3^{rd}$ coordinate in FIG. 6 and the y- and z-coordinates are perpendicular to it. If the wiper blade 10 is now pressed with a force $F_{wf}$ (arrow 24) against a window 26, particularly by the wiper arm 18, a certain force distribution p(s) is produced, which produces a moment M(s) that is maximal in the center of the support element 12. For a constant contact force distribution $$p = \frac{F_{wf}}{L}$$

which is favorable for the wiping operation, the moment is $$M(s) = p * \frac{\left(\frac{L}{2} - s\right)^2}{2}$$

and consequently, $$M(s) = F_{wf} * \frac{\left(\frac{L}{2} - s\right)^2}{2L}$$

For an outwardly decreasing contact force distribution, which is particularly suitable for tilting wiper lips over, the moment M(s) over its entire length is somewhat less than the moment calculated for a constant force distribution:

$$M(s) < p * \frac{\left(\frac{L}{2} - s\right)^2}{2}$$

If one then assumes that a friction value $\mu$ for a dry window is approximately 1, the lateral moment during operation is equal to the bending moment M(s), which in particular is a result of the preset force distribution p(s).

Based on the lateral bending moment, a lateral deflection angle γ can be inferred, which can be calculated by integration of the individual deflections from the fulcrum point of the wiper arm on the wiper blade to the wiper blade end. In the case of a centrally disposed connecting device 16, the deflection angle is calculated according to the equation:

$$\gamma = \int_0^{L/2} \frac{M(s)}{E * I_{zz}} ds$$

In view of the relation of the moment for a constant contact force distribution, a simple estimate for the angle γ is obtained by:

$$\gamma < \int_0^{L/2} \frac{p(s)\left(\frac{L}{2} - s\right)}{2 * E * I_{zz}} ds$$

Integration yields the equation:

$$\gamma < \frac{p * L^3}{48 * E * I_{zz}} = \frac{F_{wf} * L^2}{48 * E * I_{zz}}$$

Among other things, the invention is based on the knowledge that a favorable wiping quality, particularly due to rattle prevention, is achieved if the angle γ does not exceed the value 0.5° (=0.009 rad) and in particular, 0.3° (=0.005 rad). As a result, a simple relation can be deduced between the contact force and the geometric dimensions of the wiper blade, according to which $$\frac{F_{wf} * L^2}{48 * E * I_{zz}} < 0.009,$$

in particular <0.005.

For the most frequently occurring case of a rectangular profile 40, as shown in FIGS. 8 and 9, the moment of inertia is determined by:

$$I_{zz} = \frac{d * b^3}{12}$$

where
    d=thickness of the support element b=width of the support element.

The width b and the thickness d must therefore be selected so that $$\frac{F_{wf} * L^2}{4 * E * d * b^3} < 0.009,$$

in particular <0.005.

If the support element 12 is divided into two separate spring bars 42 and 44, as shown in FIG. 5, then in the above considerations in the first approximation, the width b can be assumed to be the sum of the individual widths b1 and b2: b=b$_1$+b$_2$. Hence simple relations between the width and thickness of a support element can also be deduced for systems of this kind.

For the case in which a rectangular cross sectional profile is not selected, it is then necessary to determine the moment of inertia I$_{zz}$ and to correspondingly insert it into the relations mentioned above. Likewise, cross sectional changes over the length of the wiper blade or a non-central fulcrum point of the wiper arm on the wiper blade must also be correspondingly taken into account in the above considerations.

In order to achieve the quietest possible tilting over of the wiper lip 28 from its one drag position into its other drag position, the support element 12 that is used to distribute the contact force (arrow 24) is designed so that the contact force of the wiper strip 24, or rather the wiper lip 28, against the window surface 26 is greater in its middle section 36 than in at least one of the two end sections 38.

The distribution of the contact force over the support element occurs as a function of various parameters of the support element such as the cross sectional profile, the cross sectional progression over the length of the support element, or also the radius progression R(s) along the support element. An optimization of the support element in the direction of a predetermined contact force distribution p(s) is therefore very complex. The invention is based on the knowledge that in a support element with an essentially constant, in particular rectangular cross section over the length of the support element, the contact force distribution p(s) can-be established by predetermining the curvature K along a coordinate s, which coordinate s extends along the support element. The curvature K(s) is equal to the inverse radius as a function of s:

$$K(s) = \frac{1}{R(s)}$$

In the support element, there is a relation between the bending moment M, the radius R of the support element, its elasticity modulus E, and the surface moment of inertia I prevailing at the respective location. The relation is particularly simple when it is related to the coordinate s, which adapts along with the support elements:

$$K(s) = \frac{M(s)}{E * I}$$

Double differentiation as a function of the location s yields the relation:

$$\frac{d^2 K(s)}{ds^2} = \frac{d^2 M(s)/ds^2}{E * I}$$

Since the second derivative of the bending moment M as a function of the adaptive coordinate s is equal to the contact force distribution d along the coordinate s, which arises when the support element is pressed against a window, then it follows from this that the second derivative of the curvature K as a function of the adaptive coordinate s coincides with this contact force distribution p against a flat window, with the exception of a constant. The constant depends on the elasticity modulus E as well as on the surface moment of inertia I which for its part, is very simple if the cross section in question is rectangular. When there is a preset, outwardly decreasing contact force distribution p, the curvature profile K(s) can be determined mathematically or by simple experimentation. The geometry and therefore the parameters of the support element that are required for manufacture are therefore easy for a specialist to determine.

In order to take into account the shape of the window for which the wiper blade should be used, the above relation should be adjusted such that based on the contact force distribution p along the coordinate s—which distribution is predetermined for a flat window, decreases toward the outside, and is also divided by the elasticity modulus E and the surface moment of inertia I—, the second derivative of the curvature K$_{window}$ of the window as a function of the coordinate s must be added to it:

$$\frac{d^2 K(s)}{ds^2} = \frac{p(s)}{E * I} + \frac{d^2 K_{window}(s)}{ds^2}$$

By means of this, it is also easy for the specialist to configure a support element for a particular window:

determination of the length L and the cross sectional profile, particularly the width b and the thickness d by means of experimental values, determination of a contact force F$_{wf}$ and a contact force distribution p for a flat window, which assures a favorable wiping quality, likewise by means of experimental values, measurement of the curvature progression K$_{window}$ of the window, double derivation of this curvature progression K$_{window}$ Of the window as a function of a coordinate that adapts along with the curvature, calculation of the second derivative of the curvature progression K(s) of the support element according to the above relation, double integration yields the desired curvature progression K(s) of the support element. It has turned out that favorable wiping results can be achieved if the curvature K along the adaptive coordinate a is such that the contact force distribution, which prevails when the wiper blade is pressed against a flat window, is greater than in a region approximately halfway between the center and the end of the wiper blade than it is at the end of the wiper blade. FIGS. 8 and 9 show this region 50 for one side. The invention is based on the knowledge is of less significance than the relation between e that the progression of the contact force distribution p in the region 50 to the contact force distribution p at the ends of the wiper blade. The overall length L of a wiper blade is plotted in FIGS. 8 and 9, respectively, in which the connecting element 16 is disposed in the center of the wiper blade so that the wiper blade ends each occupy the value 0.5 L.

Very favorable wiping results are achieved if the curvature K along a coordinate s that follows the longitudinal span of the support element 12 has values such that the contact force distribution p that prevails when the wiper blade is pressed against the window to be wiped is greater in the region approximately halfway between the center and the end of the wiper blade than it is at the end of the wiper blade. Although taking into account the window shape for which the wiper blade is provided does in fact limit the blade's general suitability for arbitrary window types, it also results in the fact that the selected window is wiped in an optimal manner.

FIG. 10 depicts a possible curvature progression K of the support element 12, which can produce a contact force distribution p of the wiper lip 28 against the window 15, which decreases toward the wiper blade end. With this spring elastic support element 12 which, when unstressed, has a sharper hollow curvature toward the window than this window has in the vicinity of the wiping zone swept by the wiper blade, the curvature progression K is designed so that it is sharper in the middle section 36 of the support element 12 than in its end sections 38.

Reducing the contact force of the wiper lip 28 against the window surface 26 in the vicinity of one wiper blade end or at both wiper blade ends prevents the wiper lip 28 from abruptly flipping over or snapping over as it moves from its one drag position into its other drag position. On the contrary, with the wiper blade according to the invention the wiper lip turns over in a comparatively gentle manner, starting from the end of the wiper blade, moving to the center of the wiper lip, and continuing on to the other end of the wiper lip. In combination with FIG. 1, FIG. 3 shows that even with spherically curved windows, the less intensely stressed end sections of the wiper lip 28 still rest against the window surface in an effective manner.

It is common to all of the exemplary embodiments that the contact force (arrow 24) of the wiper strip 14 against the window 15 is greater in its middle section 36 than in at least one of its two end sections 38. This is also the case when—in contrast to the wiper blade 10 graphically represented, with a one-piece support element 12 depicted as a spring strip— the support element is embodied as having several parts. In certain circumstances, however, it can also be necessary to preset other contact force distributions. But even then, wiper blades which produce excellent wiping results can be designed using the relations demonstrated.

As has already been indicated above, with the method according to the invention for producing a wiper blade, first the contour and the curvature progression K are determined and then the support element 12 is put together with the wiper strip 14 and the connecting element 16. If the support element is comprised of two parallel, flat bars, these can preferably be pre-curved with each other, i.e. directly next to each other, which assures a very symmetrical and therefore torsionally stable design of the wiper blade. Later in the process, the two support element halves must then be further processed in order to prevent an inadvertent separation. After the support element has been curved, either the wiper blade is first mounted, for example by means of being glued in place or vulcanized in place, or in particular, when there are two support element halves, by means of insertion of the support element halves into longitudinal grooves of the wiper strip, and then the connecting element is mounted. In particular, if the connecting element is welded on, the wiper strip must only be attached afterward in order to avoid thermal damage to the wiper rubber.

What is claimed is:

1. A wiper blade for windows, comprising:
at least one support element (12), a wiper strip (14), and a connecting device (16) for a wiper arm (18), wherein the support element (12) is an elongated, flat bar to which the wiper strip (14) and the connecting device (16) are attached, wherein the support element (12) has a cross sectional profile in which $$\frac{F_{wf} * L^2}{48 * E * I_{zz}} < 0.009,$$

where $F_{wf}$ is an actual contact force exerted on the wiper blade by the wiper arm (18) in condition when it is pressed against a window, L is a length of the support element (12), E is an elasticity modulus of the support element (12), and $I_{zz}$ is a moment of inertia of a cross sectional profile around a z-axis perpendicular to an taxis, which adapts along with the support element (12), and perpendicular to a y-axis, wherein the support element (12) has a substantially rectangular cross sectional profile (40), with a substantially constant width b and a substantially constant thickness d.

2. The wiper blade according to claim 1, wherein $$\frac{F_{wd} * L^2}{48 * E * I_{zz}} < 0.005.$$

3. The wiper blade according to claim 1, wherein the support element (12) is comprised of at least two individual bars (42, 44) and wherein widths (b1, b2) of the individual bars (42, 44) add up to a total width b.

4. A wiper blade for windows (15), comprising:
at least one elongated support element (12), a wiper strip (14), and a connecting device (16) for a wiper arm (18) which presses the wiper blade (10) against the window (15) in an operating position, wherein the support element (12) is an elongated, flat bar to which the wiper strip (14) and the connecting device (16) are attached, and which has a curvature when it is not loaded by the wiper arm (18), wherein the curvature along a coordinate (s), which follows a longitudinal span of the support element (12), has values such that a second derivative of the curvature as a function of this coordinate (s) is essentially proportional to a contact force distribution p (s), which is produced when the wiper blade (10) is pressed against a flat window (15), and wherein the contact force distribution decreases toward at least one end, wherein the support element (12) has a substantially rectangular cross sectional profile (40), with a substantially constant width b and a substantially constant thickness d.

5. The wiper blade according to claim 4, wherein $$\frac{d^2 K(s)}{ds^2} = \frac{d^2 M(s)}{ds^2} * E * I = \frac{p(s)}{E * I}$$

s=coordinate along the support element
K(s)=curvature of the support element
M(s)=bending moment
E=elasticity modulus
I=surface moment of inertia of the support element in relation to a neutral axis p(s)=specific force per unit length=contact force distribution.

6. A wiper blade for windows (15), comprising:

at last one elongated support element (12), a wiper strip (14), and a connecting device (16) for a wiper arm (18) which presses the wiper blade (10) against the window (15) in an operating position, wherein the support element (12) is an elongated, flat bar to which the wiper strip (14) and the connecting device (16) are attached, and which has a curvature when it is not loaded by the wiper arm (18), wherein the curvature along a coordinate (s), which follows a longitudinal span of the support element (12), has values such that a second derivative of the curvature as a function of this coordinate (s) minus the second derivative of the curvature of the window (15) decreases from a middle region (40) toward end regions, wherein the support element (12) has a substantially rectangular cross sectional profile (40), with a substantially constant width b and a substantially constant thickness d.

7. The wiper blade according to claim 6, wherein the middle region (40) is a location of the connecting device (16).

8. The wiper blade according to claim 6, wherein $$\frac{d^2 K(s)}{ds^2} = \frac{p(s)}{E * I} + \frac{d^2 K_{window}(s)}{ds^2}$$

s=coordinate along the support element
K(s)=curvature of the support element
M(s)=bending moment
E elasticity modulus
I=surface moment of inertia of the support element in relation to a neutral axis
p(s)=specific force per unit length=contact force distribution.

9. A wiper blade for windows (15), comprising:

at least one elongated support element (12), a wiper strip (14), and a connecting device (16) for a wiper arm (18) which presses the wiper blade (10) against the window (15) in an operating position, wherein the support element (12) is an elongated, flat bar to which the wiper strip (14) and the connecting device (16) are attached, and which has a curvature when it is not loaded by the wiper arm (18), wherein the curvature along a coordinate (s), which follows a longitudinal span of the support element (12), has values such that a contact force distribution p(s), which prevails when the wiper blade (10) is pressed against a flat window (15) is greater in a region (40) approximately halfway between a center and an end of the wiper blade (10) than it is at the end of the wiper blade (10), wherein the support element (12) has a substantially rectangular cross sectional profile (40), with a substantially constant width b and a substantially constant thickness d.

10. A method for producing a wiper blade assembly according to claim 1, comprising the following steps:

determining the length L and adapted contact force $F_{wf}$ required for the window to be wiped, determining a width b and a thickness d, determining a curvature progression K(s), bending the support element, connecting the supporting element, wiper strip, and connecting device.

11. The method according to claim 10, comprising the following steps:

determining the length L and the cross sectional profile, particularly the width b and the thickness d by means of experimental values, determining a contact force $F_{wf}$ and a contact force distribution p for a flat window, which assures a favorable wiping quality, likewise by means of experimental values, measuring the curvature progression $K_{window}$ of the window, double derivation of this curvature progression $K_{window}$ of the window as a function of a coordinate that adapts along with the curvature, calculating the second derivative of the curvature progression K(s) of the support element according to an above relation, double integration yields a desired curvature progression K(s) of the support element.

* * * * *